US005780525A

United States Patent [19]
Ryang et al.

[11] Patent Number: 5,780,525
[45] Date of Patent: Jul. 14, 1998

[54] PHOTOCURABLE COMPOSITION FOR ELECTRICAL INSULATION

[75] Inventors: Hong-Son Ryang, Camarillo, Calif.; An-Min J. Sung, Euclid; Joseph T. Snyder, II, Chesterland, both of Ohio

[73] Assignee: Reliance Electric Industrial Company, Cleveland, Ohio

[21] Appl. No.: 801,832

[22] Filed: Feb. 14, 1997

[51] Int. Cl.$^6$ .................................................. C08K 2/46
[52] U.S. Cl. ........................ 522/81; 522/83; 522/84; 522/85; 522/104; 522/107; 522/182
[58] Field of Search ................ 522/81, 83, 104, 522/107, 182, 84, 85, 92, 96; 427/508, 512, 517, 519

[56] References Cited

U.S. PATENT DOCUMENTS 5,519,088   5/1996   Itoh et al. ................................ 524/812

Primary Examiner—Christopher D. Rodee
Assistant Examiner—Cheryl Juska
Attorney, Agent, or Firm—Michael E. Hudzinski; John M. Miller; John J. Horn

[57] ABSTRACT

A process for providing a metal oxide-containing coating on a compatible substrate, the coating being transparent to a photocuring source output and upon cure being resistant to electrical stress. The process of the invention comprises a) preparing a precursor composition comprising a mixture of a stabilizer and a metal oxide sol precursor material; b) combining the stabilizer/metal oxide sol precursor material mixture with a photocurable base resin without high shear mixing to achieve a homogeneous, transparent composition; c) coating the substrate material with the transparent composition; and d) photocuring the coated substrate bearing the transparent composition, wherein the cured coating is homogenous and transparent and remains transparent in the use state, thereby rendering the coating corona resistant. This invention further relates to the coated substrate.

18 Claims, No Drawings

PHOTOCURABLE COMPOSITION FOR ELECTRICAL INSULATION

The invention relates to insulative coatings which exhibit high electrical stress endurance and are photocurable. More specifically, the invention relates to photocurable coatings which improve bulk electrical stress endurance.

BACKGROUND OF THE INVENTION

Insulation coatings are needed in many applications, and are particularly important in electrical applications. Electrically insulative coatings need to exhibit high thermal, electrical and chemical endurance in order to prevent premature insulation failures in the electrical component insulation of motors, particularly under high voltage impulse conditions. Thermally curable electrical component coatings have been used historically to insulate magnet wire and other electrical components and cable products. These coatings, however, often times have a large void volume, which generates corona (partial discharge) under electrical stress, thus causing coating failure. The void volume of a coating is at least partially a function of the amount of shear mixing necessary to produce a uniform coating composition. It is also solvent dependent, to some extent, which affects the viscosity of the coating components.

Photocurable electrical component coatings can improve bulk electrical stress endurance by generating substantially less internal void volume, as compared to heat or thermal curable solvent-based coatings. However, these photocurable coating systems or compositions may still lack electrical stress endurance. Thermally curable electrical component coatings include inorganic additives to achieve the desired surface electrical stress endurance. Such inorganic additive materials include alumina, silica, fumed metal oxide particulate additives, and other such materials. U.S. Pat. No. 4,760,296, for example, discloses the inclusion of organosilicates or organoaluminates as the organo-metallic material of choice to achieve improved electrical stress endurance. The '296 disclosure further provides for the use of these materials on the basis of a specified particle size range and on the presence of only Si—O or Al—O bonds within the additive material.

The foregoing additions of metal oxide additive materials are, however, in each instance unsuited for use with photo-cured processing due to the lack of necessary transparency of the coating material to the cure medium. The use of these non-transparent materials with photocure processing techniques results in non-uniform coating curing, as the light energy curing agent may unevenly penetrate the coating, due to particle blockage and scattering, thus curing some coating segments and not curing others. Another problem caused by the same uneven, non-uniform penetration of the curing agent is premature cure of the coating. The '296 patent also claims that organoaluminate and organosilicates, such as aluminum acetylacetonate and aluminum di-sec-butoxide acetoacetic ester chelate, can be used to produce clear resins. However, these organoaluminum compounds are limited to use in epoxy resin-based systems and are not suitable for the present acrylic-based system because they are generally not good co-reactants for acrylics. As a result, they tend to (1) plasticize the cured articles, (2) generate nonuniform distribution of the additives in the cured articles, and/or (3) bleach out with aging, all of which factors limit the amount of such compounds which can be added to the base resin.

What is needed is an electrical component insulation or coating which is photocurable and allows for ease and speed with respect to the coating of a substrate, and which results in a coating which exhibits not only internal electrical stress endurance, but which exhibits surface electrical stress endurance as well. It is also desirable to provide a coating or insulation which is uniform, smooth, continuous and pinhole free. Finally, it is very desirable that the coating or insulation have a long shelf life, and not suffer from precipitation of the additive material either over time or in reaction to various environmental factors.

SUMMARY OF THE INVENTION

The invention relates to a process for providing an aluminum oxide-sol containing coating on a compatible substrate, the coating being transparent to a photocuring source output and upon cure being resistant to electrical stress, high temperature and corona discharge. The process of the invention comprises a) preparing a precursor composition comprising a mixture of a stabilizer and a metal oxide sol precursor material; b) combining the stabilizer/metal oxide sol precursor material mixture with a photocurable base resin without high shear mixing to achieve a homogeneous, transparent composition; c) coating the substrate material with the transparent composition; and d) photocuring the coated substrate bearing the transparent composition, wherein the cured coating is homogenous and transparent, thereby rendering the coating corona resistant. This invention further relates to the coated substrate.

DETAILED DESCRIPTION OF THE INVENTION

The invention relates to an insulation material to be used on electrical components and other substrates that is homogenous in the cured form, thus rendering the substrate coated with this insulation material highly corona resistant. The coating of this invention is suitable for photocure processing due to the transparency of the coating composition in the uncured state, as it is applied to the substrate, and due to the fact that the coating is not rendered opaque upon curing. An added benefit to the use of this photocurable coating as compared to formerly known thermal cure, opaque coatings is that this coating can be cured much quicker than the thermal cure coatings, thus reducing processing time and costs. Alternatively, this coating can also be thermally cured in the presence of compounds that can generate free radicals upon heating, for example peroxides such as benzoyl peroxide. In general, the resulting coated article remains transparent.

While not being bound by any specific mechanism or theory, it is speculated that the coating which results from photocuring the coating composition described herein may be substantially void free. By "substantially void free" it is meant that the coating is pinhole-free, lacking holes or other fissures in the coating surface or in the volume thereof, or is at least free of voids of sufficient size to generate corona discharge. Voids which generate corona discharge are the location where corona attack occurs. The absence of voids in the cured coating therefore translates into a coated substrate wherein the coating is not susceptible, as are coatings which are not void free, to degradation from high electrical stress which adversely affects coating life and performance. This may be one reason that the subject coating exhibits enhanced electrical endurance over prior known coatings.

The coating is also characterized by its homogenous nature after cure. The term "transparent" as used herein with relation to the cured coating refers to the homogeneity of the coating at the molecular level.

The coating further is a low viscosity composition. An obvious advantage to use of this coating is therefore seen clearly in the ability to more easily comply with environmental guidelines and regulations.

Another advantage maintained by using an insulative coating consistent with that disclosed herein is the capability to apply the coating in a very thin coat. This is due to the lack of particulate matter in the coating composition, which allows the coating to be applied uniformly over the entire substrate surface with ease. Substrates, such as round and rectangular copper wire for rotating machinery, due to the very thin coating which can be effectively applied and yet remain useful, can be more tightly packed, or wound. This feature alone can aid in reducing motor or other part sizes, and yet allows the maintenance of the electrical stress profile of this material. Alternatively, thicker coatings are also easily achieved due to the transparent nature of the coating composition which greatly enhances the ease of curing the coating at any thickness by photoemissive source.

Coatings of this type will find application in any field where substrates require insulative protection. The coating has excellent electrical and thermal characteristics, and is mechanically sound as well. For instance, the coating is desirable for use in coating stators for use in various motor applications. These devices encounter considerable electrical stress and their performance and life are substantially enhanced by the use of a highly corona resistant coating. These coating are more particularly and advantageously suited to those applications where the transparency of the resulting coating enhances the workability or usability of the coated substrate. Products which will benefit from use of this coating for these reasons, or for reasons in addition to the above, are products such as photoelectronic devices and optoelectronic devices or components, such as optical sensors and wave guides to name only a few. These types of products are enhanced by the transparency of the coating in the cured state, as well as by the high corona resistant characteristic of the coating.

Ceramic additives, such as glass fillers or mica, have historically been a material of choice in coating for protecting many of the products for which this coating is intended. This is based on the fact that ceramics are by nature highly resistive to high temperature processing, both in production and in use, and they are highly resistive to oxidative degradation. Most ceramic additives, however, due to their compositional and physical makeup, require the use of high shear mixing to achieve a uniform, homogeneous composition suitable for coating process conditions. High shear mixing inherently creates voids in the resulting, cured coating due to the entrapment of air in the coating mixture and the creation of voids in the coating upon cure by the release of entrapped air and gases. The presence of voids in the cured coating allows corona generation which attacks the underlying substrate and degrades the coating itself under electrical stress when in use.

Particularly popular for use in the prior art thermal cure processes are fumed metal oxides. These materials, however, are very high viscosity materials and generally require the use of organic solvents to achieve a coatable composition. The organic solvents, or volatiles, used to achieve a workable viscosity level create voids in the resulting coating, thus rendering the coating susceptible to corona attack. Further, because of the particle size of the particulate metal oxides used, photocure processes are unsuitable to cure the coatings. The larger particles cause scattering of the irradiated light, which renders the coatings subject to incomplete and non-uniform curing. These problems are overcome in this new coating by the use of metal oxide precursor materials in the sol-gel or colloidal form, which are very low viscosity materials and which create transparent coatings susceptible to photocuring processes.

Disadvantages found with the use of fumed aluminum oxide include the fact that a clear solution cannot be formed, and that the viscosity is generally very high. Conventional organoaluminum compounds are generally not good coreactants for acrylics, as stated above, and as a result, they tend to (1) plasticize the cured articles, (2) generate nonuniform distribution of the additive in the cured articles and/or (3) bleach out with aging, which limits the amount of such compounds mixed into the resin.

The Coating

The coating composition includes a suitable base resin system which is compatible with the underlying substrate, i.e., it will provide good adhesion, and which has good thermal characteristics. The resin system formulation used in this coating includes a suitable base or bulk resin, a cross-linking agent, and a photoinitiator. Preferred base or bulk resins are those polymer resins which are UV curable, such as acrylics, methacrylates and unsaturated polyesters. Examples of suitable acrylic resins include monoacrylics, diacrylics, triacrylics, tetraacrylics, penatacrylates.

In general, the formula for suitable acrylics is

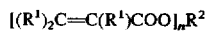

where $R^1$ is selected from hydrogen and a $C_{(1-13)}$ monovalent radical, $R^2$ is a polyvalent organic radical, and n is an integer having a value of 1 to 4, inclusive.

Examples of monoacrylics include isobornylacrylate, isobornylmethacrylate, ethoxyethoxyethyl acrylate, 2-carboxyethylacrylate, ethylhexylacrylate, 2-hydroxyethylacrylate, 2-phenoxyethylacrylate, 2-phenoxyethylmethacrylate, 2-ethylbutylmethacrylate, 9-anthracenylmethyl methacrylate, 4-chlorophenylacrylate, cyclohexylacrylate, dicyclopentenyloxyethyl acrylate, 2-(N, N-diethylamino)ethyl methacrylate, dimethylaminoeopentyl acrylate, caprolactone 2-(methacryloxy)elthylester, and furfurylmethacrylate, poly(ethylene glycol)methacrylate, acrylic acid and poly(propeylene glycol)methacrylate.

Examples of suitable diacrylates include 2,2-Bis(4-methacryloxyphenyl)propane, 1,2-butanediol diacrylate, 1,4-butanediol diacrylate, 1,4-butanediol dimethdcrylate, 1,4-cyclohexanediol dimethacrylate, 1, 10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N'-1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates include tris(2-hyroxyethyl) isocyanurate trimethacrylate, tris(2-hydroxyethyl) isocyanurate triacrylate, trimethylolpropate trimethacrylate, trimethylolpropane triacrylate and pentaerythritol triacrylate.

Examples of tetracrylates include pentaerythritol tetraacrylate, di-trimethyloproprane tetraacrylate, and ethoxylated pentaerythritol tetraacrylate.

Examples of pentaacrylates include dipentaerythritol pentaacrylate and pentaacrylate ester.

The base resin of the coating composition of the present invention also contains other radiation curable aliphatically unsaturated organic compounds, such as acrylamides of the general formula

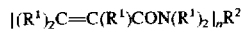

wherein $R^1$ and $R^2$ are as previously defined, and n is an integer having a value of 1 to 4, inclusive; and unsaturated polyesters, which are condensation products of unsaturated dicarboxylic acids and diols, and vinyl compounds, or compounds having a terminal double bond. These materials are co-cured with the acrylic component by free radical technique. Examples of vinyl compounds include N-vinylpyrrollidone, styrene, vinyl naphthalene and vinylphtalimide.

The resin system of the photocurable compositions of the present invention also contain a photosentisizing amount of a photinitiator or a combination of photoinitiators, i.e., an amount effective to effect the photocure of the composition in a non-oxidizing atmosphere, for example nitrogen, by absorbing the light energy, whether UV or visible, and generating radicals. Generally, the photoinitiator(s) is included in the resin in an amount of from about 0.01% to about 8.0% by weight, and preferably from about 0.1% to about 5.0% by weight of the photocurable resin. For example, some suitable unimolecular photoinitiators, which absorb light and decompose to generate radicals, include 2,2-dimethoxy-2-phenylacetophenone, 2-methoxy-2-phenylacetophenone, 2-dimethylamino-2-benzyl- 1 (4-morpholiniphenyl)-buten- 1-one and diphenyl-2,4,6-trimethlbenzoylphosphine oxide.

Bimolecular photoinitiators, where photoabsorbing compounds such as ketones react with electron donating compounds such as amines to generate radicals, include combinations of ketones and amines. Examples of such ketones are benzophenone, acetophenone, 2-isopropylthiothanthone, xanthone, benzyl, comphorquinone and coumarin derivatives. Examples of the amines include 2-(dimethalamine) ethanol and methyl p-(dimethylamino)benzoate.

The cross-linking agent used as part of the base resin system is used in addition to the monofunctional group to achieve specific properties in the resulting material, i.e., softness, high temperature performance, etc. Suitable cross-linking agents according to this standard include di-functional and tri-functional acrylics, such as Bisphenol-A dimethacrylate, tetra-functional acrylics, and di-pentaacrylates, such as dipentaerythretol pentaacrylate.

The base resin system of the photocurable resin composition of the present invention is used in combination with metal oxide sol stabilized with a compound having a photocurable functional group and a chelating group. In general, a metal oxide sol can be produced by hydrolysis of the sol components that pass through a solution state and then a gel state and the subsequent condensation thereof. Metalorganic compounds or inorganic salts, such as metal alkoxides, metal carboxylates, metal halides and metal nitrates are suitable sol precursor materials. Metal alkoxides are the preferred precursor materials.

More specifically, metal oxide sol-gel materials for use herein are prepared according to a process whereby the metal oxide precursor is first partially hydrolyzed to form reactive monomers, then these monomers undergo polycondensation to form colloid-like oligomers, i.e. sol formation, and finally an additional hydrolysis process promotes polymerization and cross-linking to form a matrix, or gel. The various reactions in fact occur simultaneously after the initial processing state, hence the connotation "sol-gel". See C. J. Brinker and G. W. Sherer, *Sol-Gel Science, Physics and Chemistry of Sol-Gel Processing*, Academic Press, San Diego, 1990.

As has been stated above, the metal oxide sol component of this coating composition provides properties which are advantageous in the processing of the coating and in the coating itself which are unattainable from other metal oxide sources. Fumed meal oxide, popular in prior insulative coatings, does not form a clear solution, and further is generally of a very high viscosity, thus requiring increased solvent use to attain a coatable composition. Conventional organoaluminum compounds are in general not good co-reactants with acrylic resin components, causing cured articles to display increased plasticity, causing the compositions to generate cured articles having non-uniform additive distribution, i.e., the coating is not homogenous, and causing the cured articles to bleach with aging, causing a necessity to limit the amount of such components which can be mixed into the base resin. U.S. Pat. No. 5,468,789 discloses a process for producing a UV curable hardcoat including colloidal silica and using a water-based system. The subject preferred metal oxide sol which is an aluminum oxide sol material, would not be suitable for use in the '789 processing technique, however, because colloidal aluminum oxide is substantially more reactive than colloidal silica and therefore requires stabilization with a strong counter anion, such as a nitrate anion. These anions, however, are not suitable for use in electrical applications because they are generally conductors. Therefore, aluminum oxide is not suitable for use in a water-based system. In addition, with this material there is a risk of gelation, which would cause the resulting article to be opaque and non-uniform upon drying.

The stable metal oxide sol used in the present photocurable composition for electrical insulation can be prepared in accord with the following procedure. Preferably, the metal oxide sol for use herein is aluminum alkoxide sol material. An aluminum alkoxide, such as aluminum isopropoxide or aluminum sec-butoxide, formed in an appropriate amount of solvent, preferably in an alcohol solvent, is first treated at room temperature with the chelating compound. The solvent may be a material such as isopropanol, sec-butanol, methoxyethanol, ethoxyethoxyethanol or ethylene glycol. The chelating compound is included at a molar ratio of aluminum alkoxide:chelating compound of approximately from 1:0.1 to 1:3, preferably from about 1:0.2 to 1:1.5. Subsequent to treatment with the chelating compound, the alkoxide is treated at room temperature with deionized water, typically at a molar ratio of aluminum oxide:water of about 1:0.5 to 1:3, for hydrolysis and condensation. The resulting aluminum oxide sol can be mixed with acrylic monomers, a photoiniator, and other ingredients, such as an adhesion promoter, to form a clear solution. An advantage of the coating composition formed in this manner is that this solution does not form any precipitate, even over a long period of time, at least about six (6) months, or when stored in a dark place, and can be coated onto a substrate in a uniform manner using various coating methods which will be known to the skilled artisan and can readily be adapted to the subject coating process.

The solvent used to prepare the aluminum alkoxide sol can be removed before mixing the sol with monomers and other ingredients under vacuum. Alternatively, the solvent may be removed from the sol after it has been combined with other coating components, but prior to applying the coating composition to the substrate. Finally, the aluminum alkoxide sol solvent may be removed from the coating composition subsequent to the coating procedure by the application of heat, at temperatures high enough to volatize the solvent.

In yet another alternative embodiment, water can be added for hydrolysis and condensation after mixing with monomers and other ingredients. The coating composition can also be prepared in acrylic monomers without a solvent, or in the absence of a non-reactive element such as a non-reactive diluent, as set forth in Example 9 below.

The sol component, or additive, may be included as up to about 70% by weight of the total coating composition. Preferably, at least about 0.5% by weight of the total coating composition is the metal oxide sol additive, and more preferably the coating contains from about 1.0% to about 40.0% by weight of the metal oxide additive. The amount of additive used in a particular coating is determined by processability and performance of the coating, by viscosity requirements, by mechanical, electrical and thermal properties, and by coating concerns. It is advantageous to use as much of the metal oxide additive as possible to achieve increased insulative benefits. The amount used is, however, limited in a practical respect by the mechanical parameters of the coating.

The metal oxide additive, as stated above, is used in the sol form. A sol, as the term is used herein, refers to a composition comprising a liquid colloidal dispersion. The subject metal oxide sol mixes homogeneously with the remaining coating components to create a clear composition, transparent to a photocure source regardless of thickness, and not susceptible to metal oxide precipitation.

When using a photo initiated curing process, it is generally necessary to have particles of less than 0.2 microns. Particles in excess of 0.2 microns would be capable of scattering light, thus potentially resulting in uneven curing. Because the invention employs a metal oxide sol, which has no particulate matter, scattering is not a concern. Because of the lack of true particles, the coating is a homogenous mixture which provides uniform resistance to oxidation. This contrasts with particulate fillers which require high speed mixing to maintain homogeneity. Once mixing is stopped, the particles tend to agglomerate causing regions of higher particle concentration and regions of lower concentration. This can lead to accelerated oxidation in the particle-poor regions.

Another drawback to the use of a metal oxide precursor material in other than the sol or colloidal form is the propensity for precipitation of the material from the coating solution over time, thus limiting the shelf life of the coating composition. For example, the use of commercially available fumed alumina or silica results in precipitation of the particulate metal oxide material after about one week in storage. This is avoided in the coating composition provided herein by the lack of any appreciable particle size, or the use of the sol/colloidal form of the metal oxide material, which affords the creation of a homogeneous mixture, thereby eliminating any possibility of precipitation.

The metal oxide sol is used in combination with a stabilizer comprising a chelating compound containing at least one photoreactive functional group and at least one chelating functional group. The photoreactive functional groups include an acrylic unsaturated bond and other radiation curable aliphatically unsaturated functional groups, such as vinyl and acrylamide groups. These photoreactive functional groups can ensure good compatibility of the compound with the base resin not only before cure, but after cure, by co-reacting with the monomers upon exposure to light. The resulting coating is an inorganic/organic nanocomposite in which the sol is uniformly distributed in the matrix at a molecular level and can overcome problems associated with conventional organoaluminum compounds.

The chelating functional groups include beta diketone, acetal acetate, and salicylic acid. Hydroxyquinoline is also a good coordination functional group. These chelating functional groups react with aluminum to form a coordinated aluminum complex that can prevent gelation of the sol by retarding further hydrolysis and/or condensation during the coating operation and have excellent storage life.

Among the stabilizers which can be used in the practice of the invention there are included 2-(methacryloyloxy)ethyl acetoacetate, 5-(methacryloyloxy)methyl salicylic acid, and 4-methacryloylamino salicylic acid. Also, poly(ethylene glycol) methacrylate, and poly(propylene glycol) methacrylate may be used as supplemental stabilizers by adding the compound to the base resin in a lower amount and using the resin in conjunction with one of the above stabilizers.

Processing

In preparing the coating composition, the most important factor is to ensure that the chelating agent is added to the solution and coordinates with the aluminum prior to the addition of water to the system. In this regard, the coating composition can be prepared by first combining the metal oxide precursor and the chelating compound stabilizer. This mixture is then added to the base resin system, without high sheer mixing, to produce a homogeneous, transparent coating composition. The fact that the metal oxide is used in the sol form has an added benefit in that it is not necessary to use organic solvents, as would be needed to reduce viscosity levels if particulate metal oxide material was used.

The coating composition is applied to the substrate or work piece by any of a number of known coating techniques, which include but are not limited to spin coating, dip coating, spray coating, electrical components coating, die coating, and bar coating. The viscosity of the coating composition need only be the coatable range to afford the use of this wide array of coating techniques.

The coated workpiece or substrate is then exposed in the conventional manner to a photocuring source. Whether the photocure is by UV or visible light depends on the photosensitizer used in the coating composition. Because the coating composition is transparent and readily transmits the irradiated light from the photocure source, the coating easily achieves a complete, uniform cure. The thickness of the coating is of little or no importance, other than as a matter of practical efficiency due to cost and end use, such as potential packing density which may be enhanced by the use of very thin coatings. The cured coating is substantially completely transparent, as was the coating composition prior to the curing process.

EXAMPLE 1

Preparation of Aluminum Trimethoxyethoxide

A mixture of aluminum triisopropoxide (20.4 gm) and 2-methoxyethanol (76 gm) in a round bottle flask was heated to 90° C. for one (1) hour to obtain a homogenous solution. Subsequently, part of the solvent (mainly isopropanol) was removed under vacuum to give a clear, low viscosity solution (54.5 gm), containing 46% aluminum trimethoxyethoxide.

EXAMPLE 2

Preparation of Aluminum Sol

A mixture of aluminum triisopropoxide (2.99 gm, 14.7 mmole) and 2-methoxyethanol (13 gm) was stirred at 90° C.

until a clear solution was obtained. After cooling to room temperature, 2-(methacryloyloxy)ethyl acetoacetate chelating agent (1.6 gm, 7.5 mmole) was first added to the solution and the resulting solution was stirred for 30 minutes before the addition of deionized water (0.26 gm, 14.7 mmole). The resulting mixture was further stirred for one (1) hour to obtain a clear and stable aluminum sol solution which showed no gel formation even over three (3) months after preparation.

Without the chelating agent, the aluminum alkoxide solution quickly generated gelatinous white precipitate upon exposure to moisture.

EXAMPLE 3

Preparation of Aluminum Sol

A mixture of aluminum triisobutoxide (1.56 gm, 6.3 mmole) and 2-propanol (3.8 gm) was stirred for ten (10) minutes at room temperature. To the solution, 2-(methacryloyloxy)ethyl acetoacetate chelating agent (0.65 gm, 3 mmole) was added and the resulting solution was stirred for thirty (30) minutes. The addition of deionized water (0.11 gm, 6.3 mmole), followed by stirring for one (1) hour, gave a clear and stable aluminum sol solution which showed no gel formation even over three months after preparation.

Without the chelating agent, the aluminum alkoxide solution quickly generated gelatinous white precipitate upon exposure to moisture.

EXAMPLE 4

Preparation of a 4-(methacryloyl-amino)salicylic Acid Chelating Agent

To a solution of purified toluene/diethyl ether (30 ml/30 ml), 4-aminosalicylic acid (6.58 gm, 43 mmole) was added in a glass vessel. After cooling to below 5° C. (in an ice/water bath), methacryloylchloride (5 gm, 43 mmole) was slowly added to the mixture while stirring. The resulting mixture was stirred for three (3) hours, during which the temperature was allowed to increase gradually to room temperature. The solid fraction was collected by filtration and then washed several times with toluene/diethyl ether. The organic extracts were combined, washed with a small amount of water, and dried with $Na_2SO_4$. Removal of the solid under vacuum gave a colorless solid (4.5 gm). FTIR of the solid confirmed the formation of 4-(methacryloylamino)salicylic acid.

EXAMPLE 5

Preparation of Aluminum Sol

To a solution of aluminum trisobutoxide (0.24 gm, 0.98 mmole) and 2-methoxyethanol (0.76 gm), 4-(methacryloylamino)salicylic acid chelating agent (0.19 gm, 0.92 mmole) was added and the solution was stirred for thirty (30) minutes. The addition of deionized water (17 mg, 0.94 mmole) and stirring for one (1) hour to give a clear and stable aluminum sol.

EXAMPLE 6

UV-Curable Resin Composition

A mixture of tris(2-hydroxyethyl)isocyanurate triacrylate (Sartomer SR368, 9.0 gm), urethane acrylate (Sartomer CN971 A80, 13.2 gm), bisphenol A ethoxylate (1 EO/phenol) diacrylate (Aldrich Chem., 60 gm), and isobornyl acrylate (Sartomer SR 506, 9.0 gm) in a brown glass bottle were stirred until a homogenous solution was obtained. Subsequently, 2-isopropylthioxanthone photoinitiator (0.36 gm) and ethyl 4-dimethylaminobenzoate co-photoiniator (1.08 gm) were added, and the resulting solution was further stirred to give a clear solution.

EXAMPLE 7

Coating Composition Containing Aluminum Sol

The aluminum sol solution from Example 2 (17 gm) was charged into a flask and the volatiles were removed under vacuum to give a clear viscous residue (2.9 gm). To the residue, the resin mixture from Example 6 (5.62 gm), isobornyl acrylate (1.25 gm) and 2-methoxyethanol (2 gm) were added, and the resulting mixture was stirred to obtain a clear solution. The coating system was applied onto a glass plate and UV-cured for one (1) minute under $N_2$ using a BLAK-RAY UV Lamp B™ (UVP Corp., Upland, Calif.) to form a clear hard film having good adhesion to the substrate.

EXAMPLE 8

Coating Composition Containing Aluminum Sol

A solution containing the aluminum trimethoxyethoxide solution from Example 1 (1 gm), isobornyl acrylate (3 gm), trimethylolpropane triacrylate (0.36 gm), 2-(methacryloyloxy)ethyl acetoacetate chelating agent (0.34 gm), 2-isopropylthioxanthone photoinitiator (0.05 gm), and ethyl 4-dimethylaminobenzoate co-photoinitiator (0.14 gm) was stirred at room temperature for thirty (30) minutes. After the addition of deionized water (0.03 gm), the resulting solution was further stirred for one (1) hour. Removal of the volatiles under vacuum gave a clear solution (4.1 gm) . The solution was bar-coated onto a glass plate and UV-cured for one (1) minute under $N_2$ to give a clear, hard film with good adhesion to the substrate.

The identical solution without the chelating agent was also prepared. In this case, however, the solution became opaque upon the addition of water, and gradually generated a white precipitate. Attempts to form a clear uniform coating were unsuccessful due to the formation of gelatinous white precipitates during the application of the coating.

EXAMPLE 9

Coating Composition Containing Aluminum Sol

To a homogenous solution containing isobornyl acrylate (3 gm), trimethylolpropane triacrylate (0.5 gm), and aluminum triisobutoxide (0.67 gm), 2-(methacryloyloxy)ethyl acetoacetate chelating agent (0.54 gm) was added, and the resulting solution was stirred for thirty (30) minutes at room temperature. After the addition of 2-isopropylthioxanthone photoiniator (0.05 gm), ethyl 4-dimethylaminobenzoate co-photoinitiator (0.14 gm), and deionized water (0.05 gm), the resulting mixture was stirred at room temperature for one (1) hour to give a clear solution. The coating composition was then applied to a glass plate and UV-cured for one (1) minute under $N_2$ to give a clear and hard film, with good adhesion to the substrate.

EXAMPLE 10

Coating Composition Containing Aluminum Sol

Three coating compositions Examples 10-1, 10-2 and 10-3, containing aluminum sol, shown in Table I, were prepared by:

(1) mixing the resin system prepared in Example 6 and the aluminum trimethoxyethoxide (ATME) solution prepared in Example 1;

(2) adding 2-(methoacryloyloxy)ethyl acetoacetate (MEAA) chelating agent;

(3) stirring for thirty (30) minutes;

(4) adding deionized water; and (5) stirring for one (1) hour.

The resulting solutions were clear and low in viscosity, and coatable by various techniques, including spin and spray coatings. No change in viscosity and clarity was observed, even after aging over three (3) months at room temperature, in the dark. They were cast onto glass plates and UV-cured for one (1) minute under $N_2$ to give clear, hard films having good adhesion to the substrate.

TABLE I

Coating Compositions Containing Aluminum Sol

| Example | Amount of Resin from Example 6 | ATME Solution from Example 1 | MEAA | Water |
|---|---|---|---|---|
| 10-1 | 3.9 gm | 1.1 gm | 0.27 gm | 0.04 gm |
| 10-2 | 3.4 gm | 2.67 gm | 0.55 gm | 0.09 gm |
| 10-3 | 2.0 gm | 3.3 gm | 0.40 gm | 0.11 gm |

EXAMPLE 11

Corona Resistance Testing

The coating compositions from Examples 6, 10-1 and 10-2 were bar-coated at various levels on the polyimide surface of 3"×3" polyimide (76.2 μm)/adhesive (20.3 μm)/copper (107 μm) laminates (GTS FLEXIBLE MATERIALS, INC., Warwick R.I.). The coated substrates were subsequently heated to 60°–80° C. and exposed to a BLAK-RAY UV Lamp Model B™ (UVP Corp., Upland Calif.) for one (1) minute under $N_2$. Test samples were also prepared by coating on a 3"×3" Cu plate having a thickness of 0.83 mm as described above. The cured films exhibited good adhesion to these substrates and no delamination was observed. These coating samples were tested for corona resistance by a needle point corona resistance test which follows a modified ASTM D2275-80 test method. The electrode assembly for the test consisted of a needle point electrode and plane arrangement with a 1 mm air gap between the electrode and the sample. The plane electrode comprised the test substrate/sample whether coated, uncoated, etc.

The test results set forth in Table II demonstrate clearly the enhanced performance of the subject coating over the use of a conventional coating or no coating, with respect to product life, i.e., time to coating failure due to corona attack.

TABLE II

Results of Needle Point Corona Resistance Testing

| Coating Composition Example | Sample Description (ATME + MEAA)/ Resin | Substrate | Coating Thickness (microns) | Applied Voltage (kV) | Time to Failure (hours) |
|---|---|---|---|---|---|
| no coating | | polyimide/copper | 0 | 5.2 | 11.6 |
| no coating | | polyimide/copper | 0 | 5.2 | 14.2 |
| 6 | 0 | polyimide/copper | 15 | 5.2 | 30.8 |
| 6 | 0 | polyimide/copper | 18 | 5.2 | 41.2 |
| 10-1 | 0.2 | polyimide/copper | 10 | 5.2 | 74.9 |
| 10-1 | 0.2 | polyimide/copper | 9 | 5.2 | 99.8 |
| 10-2 | 0.52 | polyimide/copper | 12 | 5.2 | 134.4 |
| 10-2 | 0.52 | polyimide/copper | 12 | 5.2 | 117.2 |
| 10-2 | 0.52 | polyimide/copper | 12 | 5.2 | 96.8 |
| 6 | 0 | copper | 99 | 5.2 | 25 |
| 6 | 0 | copper | 99 | 5.2 | 16.6 |
| 10-1 | 0.2 | copper | 99 | 5.2 | 315.4 |

EXAMPLE 12

Coating Composition Without Chelating Agent

A coating composition identical to that of Example 10-2, but without the chelating agent was also prepared. In this case, however, the solution became opaque upon addition of water and gradual precipitation of aluminum oxide gel was observed. The same coating composition containing neither chelating agent nor water was also prepared. The solution, when applied onto a glass plate, quickly generated a white precipitate, resulting in the formation of a non-uniform opaque film.

EXAMPLE 13

Coating Composition Stabilized with 2,4-pentane dione Chelating Agent

A coating composition comprising the resin from Example 6 (1.0 gm), aluminum trimethoxyethoxide solution from Example 1 (1.6 gm), 2,4-pentane dione chelating agent (0.28 gm), and water (0.05 gm) was prepared as described in Examples 7–9. The resulting solution was clear and low in viscosity. The coating, although clear before UV exposure, became highly opaque during UV cure, indicating the phase separation of the inorganic component due to the chelating agent having no UV-reactive functional groups.

EXAMPLE 14

Resin Composition Containing Fumed Aluminum Oxide

To the resin from Example 6 (1.76 gm), fumed aluminum oxide (Degussa aluminum oxide-C, 0.24 gm) was added in a glass bottle. Since the viscosity was too high to be able to homogenize with a magnetic stirrer, 3-methacryloxypropyltrimethoxysilane coupling agent (0.04 gm) was added to the mixture. The viscosity of the resulting blend gradually lowered and the fumed $Al_2O_3$ completely dispersed into the resin. The resin viscosity was further lowered by adding 2-methoxyethanol (0.5 gm). The resulting composition was highly opaque and was not suitable for UV cure application. Furthermore, the solution, when aged, tended to precipitate the filler.

EXAMPLE 15

UV-Curable Resin Composition

A mixture of tris(2-hydroxyethyl)isocyanurate triacrylate (Sartomer SR386, 0.95 gm), urethane acrylate (Sartomer CNN699J25, 1.4 gm), and benzylmethacrylate (Aldrich Chem., 3.5 gm) were stirred in a brown glass bottle until a homogenous solution was obtained. Subsequently, the resin was mixed with 2-isopropylthioxanthone photoinitiator (0.066 gm) and ethyl 4-dimethylaminobenzoate co-photoinitiator (0.19 gm). The resulting mixture was further stirred to give a clear solution.

EXAMPLE 16

Coating Composition Containing Aluminum Sol

A coating composition containing the resin from Example 15 (3.06 gm), the aluminum sol solution from Example 1 (1.75 gm), MEAA chelating agent (0.43 gm), and deionized water (0.06 gm) was prepared as described in Examples 10-1 to 10-3. The resulting solution was clear and low in viscosity, and suitable for coating applications.

EXAMPLE 17

Corona Endurance Testing

The coating compositions from Examples 15 and 16 were bar-coated onto the polyimide surface of 3"×3" polyimide (76.2 µm)/adhesive (20.3 µm)/copper (107 µm) laminates (GTS FLEXIBLE MATERIALS INC, Warwick R.I.), and UV-cured as described in Example 13 to give clear hard films. The cured films exhibited good adhesion to the substrate and no delamination was observed. Corona endurance testing of the samples set forth in Table III demonstrate clearly the enhanced performance of the subject coating over the use of a conventional coating or no coating with respect to product life, i.e., time to coating failure due to corona attack.

TABLE III

Results of Needle Point Corona Resistance Testing

| Coating Composition Example | Sample Description (ATME + MEAA)/Resin | Substrate | Coating Thickness (microns) | Applied Voltage (kV) | Time to Failure (hours) |
|---|---|---|---|---|---|
| no coating | | polyimide/copper | 0 | 5.2 | 12.9 |
| 15 | 0 | polyimide/copper | 18 | 5.2 | 41.2 |
| 16 | 0.4 | polyimide/copper | 9 | 5.2 | 99.8 |

While the foregoing Examples have been provided to aid the skilled artisan in more completely understanding the subject invention, they are not intended to in any way limit the scope of the invention. The full breadth of the invention will be apparent to the skilled artisan upon reading the specification, and includes the use of any and all known equivalent processes and materials.

What we claim is:

1. A process for providing a metal oxide-containing insulation coating on a compatible substrate, the coating being transparent to a photocuring source output and upon cure being resistant to electrical stress, the process comprising:
   a) preparing a precursor composition comprising a mixture of a stabilizer and a metal oxide sol precursor material, wherein the stabilizer is a chelating compound containing at least one photocurable functional group and at least one chelating functional group;
   b) combining the stabilizer/metal oxide sol precursor material mixture with a photocurable base resin without high shear mixing to achieve a homogeneous, transparent composition;
   c) coating the substrate material with the transparent composition; and
   d) photocuring the coated substrate bearing the transparent composition, wherein the cured coating is homogenous and transparent.

2. The process of claim 1 wherein the photocurable base resin is a resin system comprising a bulk resin, a cross-linking agent and a photoinitiator.

3. The process of claim 2 wherein the bulk resin comprises a UV curable polymeric resin.

4. The process of claim 3 wherein the bulk resin is selected from the group consisting of acrylics, methacrylates and unsaturated polyesters.

5. The process of claim 2 wherein the bulk resin comprises an acrylic of the general formula $[(R^1)_2C{=}C(R^1)COO]_nR^2$ wherein $R^1$ is selected from the group consisting of hydrogen and a $C_{(1-13)}$ monovalent radical, $R^2$ is a polyvalent organic radical, and n is an integer having a value of from 1 to 4.

6. The process of claim 5 wherein the bulk resin further contains a radiation curable aliphatically unsaturated organic compound selected from the group consisting of acrylamides of the general formula $[(R^1)_2C{=}C(R^1)CON(R^1)_2]_nR^2$ wherein $R^1$ is selected from the group consisting of hydrogen and a $C_{(1-13)}$ monovalent radical, $R^2$ is a polyvalent organic radical, and n is an integer having a value of from 1 to 4, unsaturated polyesters, and vinyl compounds, the radiation curable compound being co-curable with the acrylic of claim 5.

7. The process of claim 2 wherein the photoinitiator is present in a photosensitizing amount of from about 0.01% to about 8.0% by weight of the photocurable base resin, and comprises at least one photoinitiator selected from the group consisting of unimolecular and bimolecular photoinitiators.

8. The process of claim 2 wherein the cross-linking agent of the base resin system is an acrylic agent selected from the group consisting of di-functional acrylics, tri-functional acrylics, tetra-functional acrylics and di-pentacrylates.

9. The process of claim 1 wherein the metal oxide sol precursor material comprises at least one of a metalorganic compound or an inorganic salt selected from the group consisting of metal alkoxides, metal carboxylates, metal halides and metal nitrates.

10. The process of claim 9 wherein the metal oxide sol comprises a metal alkoxide.

11. The process of claim 9 wherein the metal oxide sol comprises aluminum alkoxide sol material.

12. The process of claim 9 wherein the metal oxide sol is included as up to about 70% by weight of the total coating composition.

13. The process of claim 9 wherein the metal oxide sol is included as from about 1.0% to about 40% by weight of the total coating composition.

14. The process of claim 2 wherein the metal oxide sol and the stabilizer material are used at a molar ratio of about 1:0.1 to about 1:3 metal oxide sol:stabilizer.

15. The process of claim 1 wherein the substrate is coated with the transparent composition by one of spin coating, dip coating, spray coating, electrical component coating, die coating or bar coating.

16. The process of claim 1 wherein the substrate is an electrical component.

17. The process of claim 1 wherein the coating is prepared in the absence of a non-reactive diluent.

18. A process for providing a metal oxide-containing insulation coating on a compatible substrate, the coating being transparent to a photocuring source output and upon cure being resistant to electrical stress, the process comprising:

a) preparing a precursor composition comprising a mixture of a stabilizer and a metal oxide sol precursor material, wherein the stabilizer is a chelating compound containing i) at least one photocurable functional group selected from the group consisting of an acrylic group, a vinyl group, and an acrylamide group, and ii) at least one chelating functional group;

b) combining the stabilizer and the metal oxide sol precursor material mixture with a photocurable base resin without high shear mixing to achieve a homogeneous, transparent composition;

c) coating the substrate material with the transparent composition; and d) photocuring the coated substrate bearing the transparent composition, wherein the cured coating is homogeneous and transparent.

* * * * *